United States Patent
Furutani et al.

(10) Patent No.: US 9,011,624 B2
(45) Date of Patent: Apr. 21, 2015

(54) ADHESIVE SHEET AND METHOD FOR MANUFACTURING ADHESIVE SHEETS

(75) Inventors: Ryoji Furutani, Ichihara (JP); Takahiro Tokuyasu, Ichihara (JP); Shinya Katou, Ichihara (JP); Rie Katou, Ichihara (JP); Tomohito Yuasa, Ichihara (JP); Kouji Komorida, Ichihara (JP); Tatsuya Sakuta, Ichihara (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 548 days.

(21) Appl. No.: 13/383,755

(22) PCT Filed: Jul. 9, 2010

(86) PCT No.: PCT/JP2010/061709
§ 371 (c)(1),
(2), (4) Date: Mar. 20, 2012

(87) PCT Pub. No.: WO2011/007732
PCT Pub. Date: Jan. 20, 2011

(65) Prior Publication Data
US 2012/0171475 A1    Jul. 5, 2012

(30) Foreign Application Priority Data
Jul. 14, 2009  (JP) ............................... P2009-165709

(51) Int. Cl.
B29C 65/52 (2006.01)
B32B 37/12 (2006.01)
(Continued)

(52) U.S. Cl.
CPC .............. *C09J 7/0239* (2013.01); *Y10T 428/28* (2013.01); *Y10T 428/265* (2013.01); *Y10T 156/1195* (2013.01); *C09J 2203/326* (2013.01); *C09J 2201/28* (2013.01)

(58) Field of Classification Search
CPC ........ C09J 7/02; C09J 7/0296; C09J 2201/28; C09J 2203/326; H01L 21/6835; H01L 21/6836; B29C 1/14; B29C 65/48; B32B 7/06; B32B 27/00; B32B 37/12; B32B 38/0004; B32B 38/10; B32B 38/185; C08J 5/18; Y10T 56/1195; Y10T 428/265; Y10T 428/28
USPC ......... 156/247, 249, 250, 257, 265, 267, 268, 156/701, 714, 719; 428/40.1, 41.8, 41.9, 428/42.3, 220
See application file for complete search history.

(56) References Cited

U.S. PATENT DOCUMENTS
4,282,056 A * 8/1981 Okui .............................. 156/519
6,786,266 B2 * 9/2004 Fukada ......................... 156/759

FOREIGN PATENT DOCUMENTS
JP      55-149971      11/1980
JP      59-197077      11/1984
(Continued)

OTHER PUBLICATIONS
Machine Translation of JP 2005-162818 (Aug. 11, 2014).*
(Continued)

*Primary Examiner* — Sing P Chan
(74) *Attorney, Agent, or Firm* — Antonelli, Terry, Stout & Kraus, LLP.

(57) ABSTRACT

A method for manufacturing an adhesive sheet according to the present invention is a method for manufacturing an adhesive sheet including a long peeling base material 1 and an adhesive layer 2 provided on the peeling base material 1 in the form of an island, the method including a peeling step of, after laminating a long adhesive layer 2 on the peeling base material 1, peeling off an unnecessary portion 6 of the adhesive layer 2 so that a predetermined portion of the adhesive layer is left on the peeling base material 1 in the form of an island, wherein, in the peeling step, the width W of a narrow portion 8, which is the narrowest in width in a short direction of the unnecessary portion 6 of the adhesive layer 2, is adjusted so that the breaking strength in the narrow portion 8 is 200 g or more.

2 Claims, 4 Drawing Sheets

(51) Int. Cl.
*B32B 37/26* (2006.01)
*B32B 38/10* (2006.01)
*B32B 38/04* (2006.01)
*C09J 7/02* (2006.01)

(56) References Cited

FOREIGN PATENT DOCUMENTS

| JP | 61-73179 | 5/1986 |
| JP | 01-319088 | 12/1989 |
| JP | 6-18383 | 5/1990 |
| JP | 07-045557 | 2/1995 |
| JP | 2001-335235 | 12/2001 |
| JP | 2005-162818 A | 6/2005 |
| JP | 2007-019151 A | 1/2007 |
| JP | 2009-124127 A | 6/2009 |

OTHER PUBLICATIONS

International Preliminary Report of International Appl. No. PCT/JP2010/061709 dated Feb. 16, 2012 in English.

International Search Report of International Appl. No. PCT/JP2010/061709 dated Sep. 14, 2010 in English.

* cited by examiner

ADHESIVE SHEET AND METHOD FOR MANUFACTURING ADHESIVE SHEETS

TECHNICAL FIELD

The present invention relates to an adhesive sheet and a method for manufacturing the adhesive sheet, and more specifically, to an adhesive sheet for a semiconductor and a method for manufacturing the adhesive sheet for a semiconductor.

BACKGROUND ART

Conventionally, a silver paste has been mainly used for bonding a semiconductor element and a supporting member for mounting a semiconductor element. However, along with recent miniaturization/enhancement of the performance of semiconductor elements, miniaturization/densification has also been demanded for supporting members to be used. In spite of such a demand, it is difficult for the silver paste to deal with the demand due to the occurrence of defects in wire-bonding which are attributable to side drop thereof or an incline of a semiconductor element, the difficulty in control of a film thickness of an adhesive layer made from the silver paste, the occurrence of voids in an adhesive layer, and the like.

In view of this, in order to deal with the demand, a film-shaped adhesive has been used in recent years. This film-shaped adhesive is used in a singulated-piece attaching method or a wafer-back-surface attaching method. In the case of producing a semiconductor device by the singulated-piece attaching method with the use of a film-shaped adhesive, initially, one cuts a film-shaped adhesive wound up in a roll form (a reel form) into a given size by cutting or punching, so as to obtain a singulated piece of the film-shaped adhesive. A supporting member with a film-shaped adhesive is obtained by attaching this singulated piece to a supporting member for mounting a semiconductor element. After that, one produces a supporting member with a semiconductor element by bonding (die-bonding) a semiconductor element singulated by a dicing step to the supporting member with a film-shaped adhesive. Further, through a wire-bonding step, a sealing step, and the like as needed, one produces a semiconductor device.

However, when using a film-shaped adhesive in the singulated-piece attaching method, a special assembling apparatus for cutting and bonding the film-shaped adhesive to a supporting member is necessary, and thus a problem is that a production cost is higher than a method using a silver paste.

On the other hand, in the case of producing a semiconductor device by the wafer-back-surface attaching method using a film-shaped adhesive, initially, one attaches the film-shaped adhesive to a surface (a back surface) of a semiconductor wafer which surface is opposite to a circuit surface of the semiconductor wafer, and further, one attaches a dicing tape to a surface of the film-shaped adhesive which is opposite to a semiconductor-wafer side of the film-shaped adhesive. Then, a semiconductor element with a film-shaped adhesive is obtained by singulating the semiconductor wafer and the film-shaped adhesive into individual pieces by dicing. One picks up the obtained semiconductor element with a film-shaped adhesive, and bonds (die-bonds) to a supporting member for mounting a semiconductor element. After that, through steps of heating, hardening, wire-bonding, and the like, one produces a semiconductor device.

This wafer-back-surface attaching method using a film-shaped adhesive does not require any special apparatus for singulating film-shaped adhesives, since one bonds a semiconductor element with a film-shaped adhesive to a supporting member, and it is possible to use a conventional assembling apparatus for a silver paste without any modification or with partial modification of the apparatus such as adding a heating platen. In view of this, attention is attracted as a method that can restrain a production cost relatively low, among assembly methods of a semiconductor device using a film-shaped adhesive.

However, in the above wafer-back-surface attaching method using a film-shaped adhesive, before performing the dicing of a semiconductor wafer, two attachment steps are required, i.e., a step of attaching a film-shaped adhesive to a semiconductor wafer and a step of attaching a dicing tape to the film-shaped adhesive. In view of this, in order to simplify this process, an adhesive sheet (a die-bond dicing sheet) made by attaching a film-shaped adhesive to a dicing tape so as to have both functions thereof with one piece has been developed (for example, see Patent Literature 1). Such an adhesive sheet has, for example, a three-layer structure of a peeling base material, an adhesive layer, and a self-adhesive film.

Further, a method in which one processes such an adhesive sheet in advance into a shape of a wafer to constitute a semiconductor element (so-called pre-cut processing) has been known (for example, see Patent Literature 2). The pre-cut processing is a method in which: one punches an adhesive layer along a shape of a wafer to be used; one peels the adhesive layer except for a part for attaching the wafer; one attaches a dicing tape thereto; subsequently, one punches the dicing tape along a shape of a frame (a wafer ring) for use in wafer fixation in a dicing step; and one removes an unnecessary portion.

Figure 1:
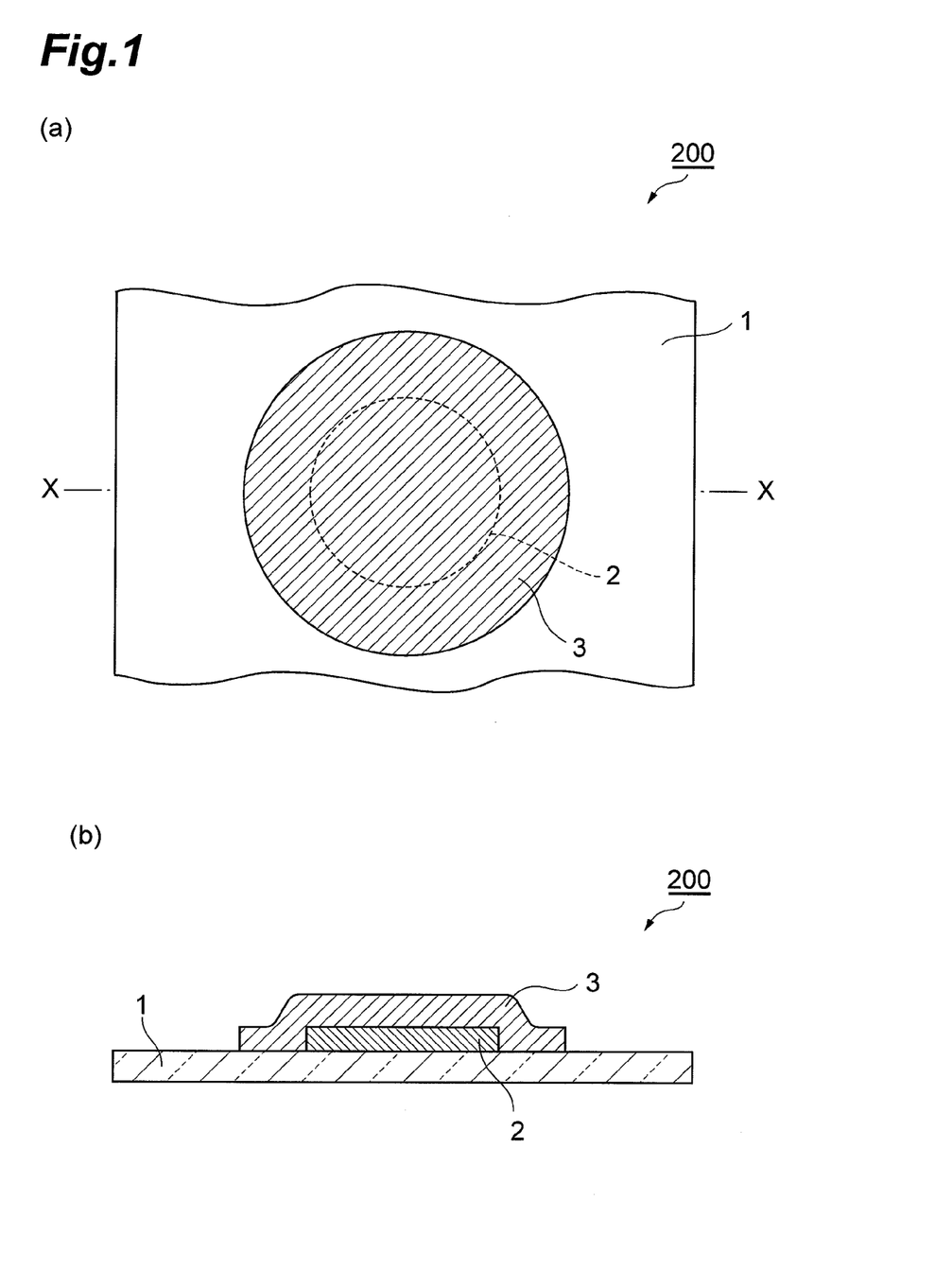
FIG. 1(a) is a plane view schematically illustrating an example of an adhesive sheet.
FIG. 1(b) is an X-X end view of a sectioned part of FIG. 1(a).

The adhesive sheet subjected to the pre-cut processing has a structure as shown in FIG. 1(a), for example. Further, FIG. 1(b) is an X-X end view of a sectioned part of a die-bond dicing sheet 200 of FIG. 1(a) in which an adhesive layer 2 is laminated on a peeling base material 1, and a self-adhesive film 3 is further laminated thereon so that a peeling base material 1 side is a surface having viscosity. Note that the self-adhesive film 3 is laminated so as to cover the adhesive layer 2 and to have contact with the peeling base material 1 around the adhesive layer 2, thereby making it possible to fix the adhesive sheet 200 by attaching the self-adhesive film 3 to a wafer ring of an outer periphery of a semiconductor wafer when performing the dicing of the semiconductor wafer.

In the case of performing such pre-cut processing, the adhesive sheet is generally produced by pre-cut processing an adhesive layer along a wafer shape in a film-shaped adhesive, attaching the film-shaped adhesive to a dicing tape, and subsequently performing the pre-cut processing of the dicing tape along a wafer-ring shape, or alternatively, by attaching a dicing tape which is pre-cut processed in advance into a wafer-ring shape to a film-shaped adhesive which is pre-cut processed in advance.

CITATION LIST

Patent Literature

Patent Literature 1: Japanese Patent Application Laid-Open Publication No. Hei-7-45557
Patent Literature 2: Japanese Utility Model Publication No. Hei-6-18383

SUMMARY OF INVENTION

Technical Problem

In the pre-cut processing of the adhesive layer, after punching the adhesive layer along a wafer shape to be used and peeling off an unnecessary adhesive layer, except for a part for attaching the wafer, one laminates the self-adhesive film thereon so that a peeling base material side is a surface having viscosity; however, the present inventors found that the following problem occurs in the step of peeling off the adhesive layer. That is, the adhesive layer is required to have various characteristics according to differences in characteristics of semiconductor elements and assembly methods of a semiconductor device, and therefore the thickness may become thin or the adhesive layer itself may become fragile. This causes the adhesive layer to be torn when peeling off an unnecessary adhesive layer, thereby resulting in that it is impossible to peel off the unnecessary adhesive layer on a long peeling base material successively.

The present invention is accomplished in view of the above problems that the conventional techniques have, and the present invention aims to provide an adhesive sheet and a method for manufacturing the adhesive sheet, each of which can prevent an unnecessary adhesive layer from being torn in a step of peeling off the unnecessary adhesive layer from a peeling base material while leaving a necessary adhesive layer on the peeling base material in a method for producing an adhesive sheet in which an adhesive layer is provided on a long peeling base material in the form of an island.

Solution to Problem

In order to achieve the above object, the present invention provides a method for manufacturing an adhesive sheet including a long peeling base material and an adhesive layer provided on the peeling base material in the form of an island, which method includes a peeling step of, after laminating a long adhesive layer on the peeling base material, peeling off an unnecessary portion of the adhesive layer so that a predetermined portion of the adhesive layer is left on the peeling base material in the form of an island, wherein, in the peeling step, the width of a narrow portion, which is the narrowest in width in a short direction of the unnecessary portion of the adhesive layer, is adjusted so that the breaking strength in the narrow portion is 200 g or more.

According to the manufacturing method, it is possible to sufficiently prevent the unnecessary adhesive layer from being torn in the peeling step of peeling off the unnecessary adhesive layer from the peeling base material while leaving a necessary adhesive layer on the peeling base material. This makes it possible to successively and efficiently peel off the unnecessary adhesive layer, thereby improving the production efficiency of adhesive sheets.

In the method for manufacturing an adhesive sheet according to the present invention, it is preferable that the thickness of the adhesive layer be 0.5 μm or more. This makes it possible to sufficiently prevent the unnecessary adhesive layer from being torn in the peeling step.

The present invention also provides an adhesive sheet which is manufactured by the above method for manufacturing an adhesive sheet according to the present invention.

Advantageous Effects of Invention

According to the present invention, it is possible to provide an adhesive sheet and a method for manufacturing the adhesive sheet, each of which can prevent an unnecessary adhesive layer from being torn in a step of peeling off the unnecessary adhesive layer from a peeling base material while leaving a necessary adhesive layer on the peeling base material in a method for producing an adhesive sheet in which an adhesive layer is provided on a long peeling base material in the form of an island.

DESCRIPTION OF EMBODIMENTS

Hereinafter, a preferred embodiment of the present invention will be described in detail with reference to the drawings. Note that, in the drawings, the same or corresponding portion has the same reference sign, and redundant explanation thereof is omitted. Further, the dimension ratio in the drawings is not limited to the ratio as shown therein.

A method for manufacturing an adhesive sheet according to the present invention is a method for manufacturing an adhesive sheet including a long peeling base material and an adhesive layer provided on the peeling base material in the form of an island, and the method includes a peeling step of, after laminating a long adhesive layer on the peeling base material, peeling off an unnecessary portion of the adhesive layer so that a predetermined portion of the adhesive layer is left on the peeling base material in the form of an island, wherein, in the peeling step, the width of a narrow portion, which is the narrowest in width in a short direction of the unnecessary portion of the adhesive layer, is adjusted so that the breaking strength in the narrow portion is 200 g or more. According to the manufacturing method, it is possible to prevent an adhesive layer to be peeled off from being torn when an unnecessary portion of the adhesive layer is peeled off.

FIGS. 2(a) to 2(d) and FIGS. 3(e) to 3(h) are a series of process drawings showing one preferred embodiment of the method for manufacturing an adhesive sheet according to the present invention. In the method for manufacturing an adhesive sheet according to the present embodiment, initially, as shown in FIG. 2(a), one laminates a long adhesive layer 2 on a whole area of a long peeling base material 1. Then, as shown in FIG. 2(b), with the use of a mold 5 or a member equivalent to it, one forms a slit from a plane F1 on one side of the adhesive layer 2 which is opposite to another side thereof which has contact with the peeling base material 1, so that the slit reaches the peeling base material 1, thereby performing punching processing into a predetermined shape. After that, as shown in FIG. 2(c), one peels off and removes an unnecessary portion 6 of the adhesive layer 2 (hereinafter, referred to as an "unnecessary adhesive layer 6") on which one performs the punching processing (a peeling step). Thus, as shown in FIGS. 2(c) and 2(d), one forms, on the peeling base material 1, the adhesive layer 2 having a predetermined planar shape and provided in the form of an island.

Figure 3:
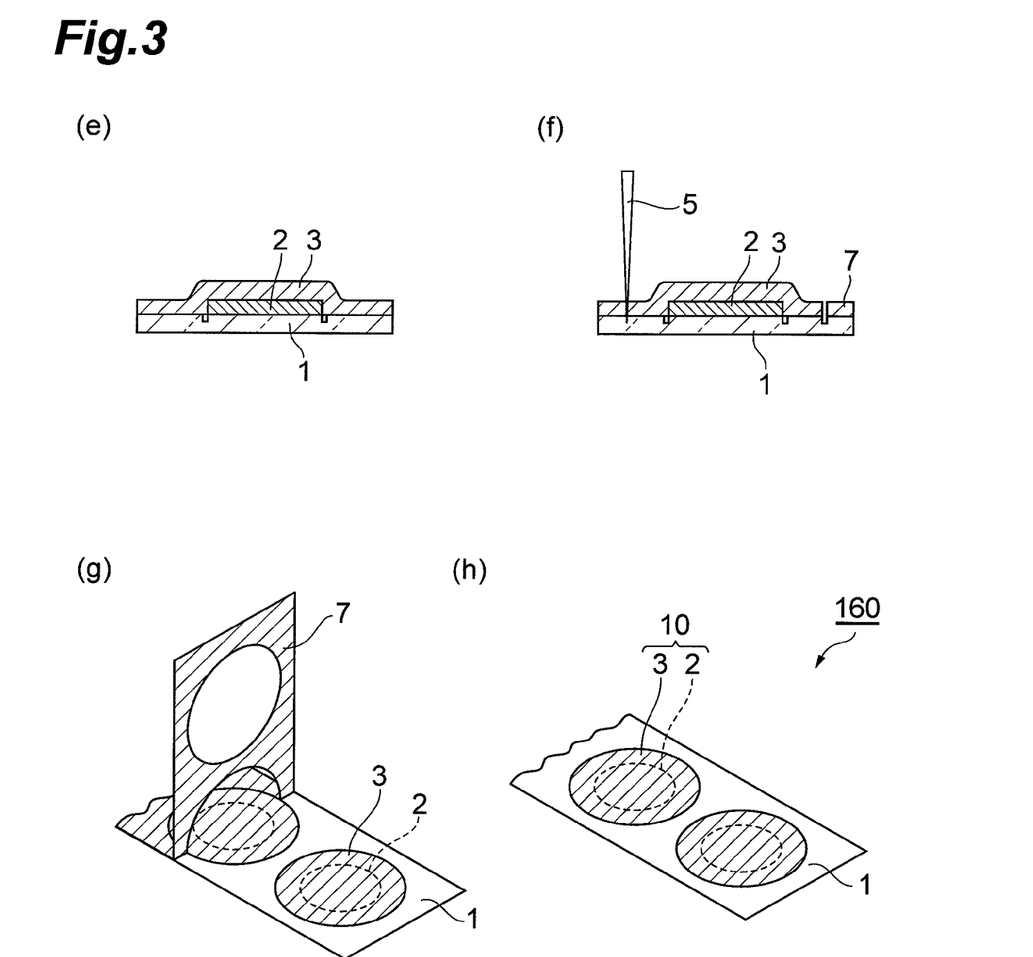
FIGS. 3(e) to 3(h) are a series of process drawing showing one preferred embodiment of a method for manufacturing an adhesive sheet according to the present invention.

Then, as shown in FIG. 3(e), one laminates a self-adhesive film 3 thereon so as to entirely cover the adhesive layer 2 and an exposed peeling base material 1. Subsequently, as shown in FIG. 2(*f*), one performs punching processing on the self-adhesive film 3 with the use of the mold 5 or the like. After that, as shown in FIG. 3(*g*), one peels off and removes an unnecessary portion 7 of the self-adhesive film 3 on which one performs the punching processing. Hereby, as shown in FIG. 3(*h*), one forms a layered product 10 made up of the adhesive layer 2 and the self-adhesive film 3 on the peeling base material 1. In this way, an adhesive sheet 160 is produced.

Figure 2:
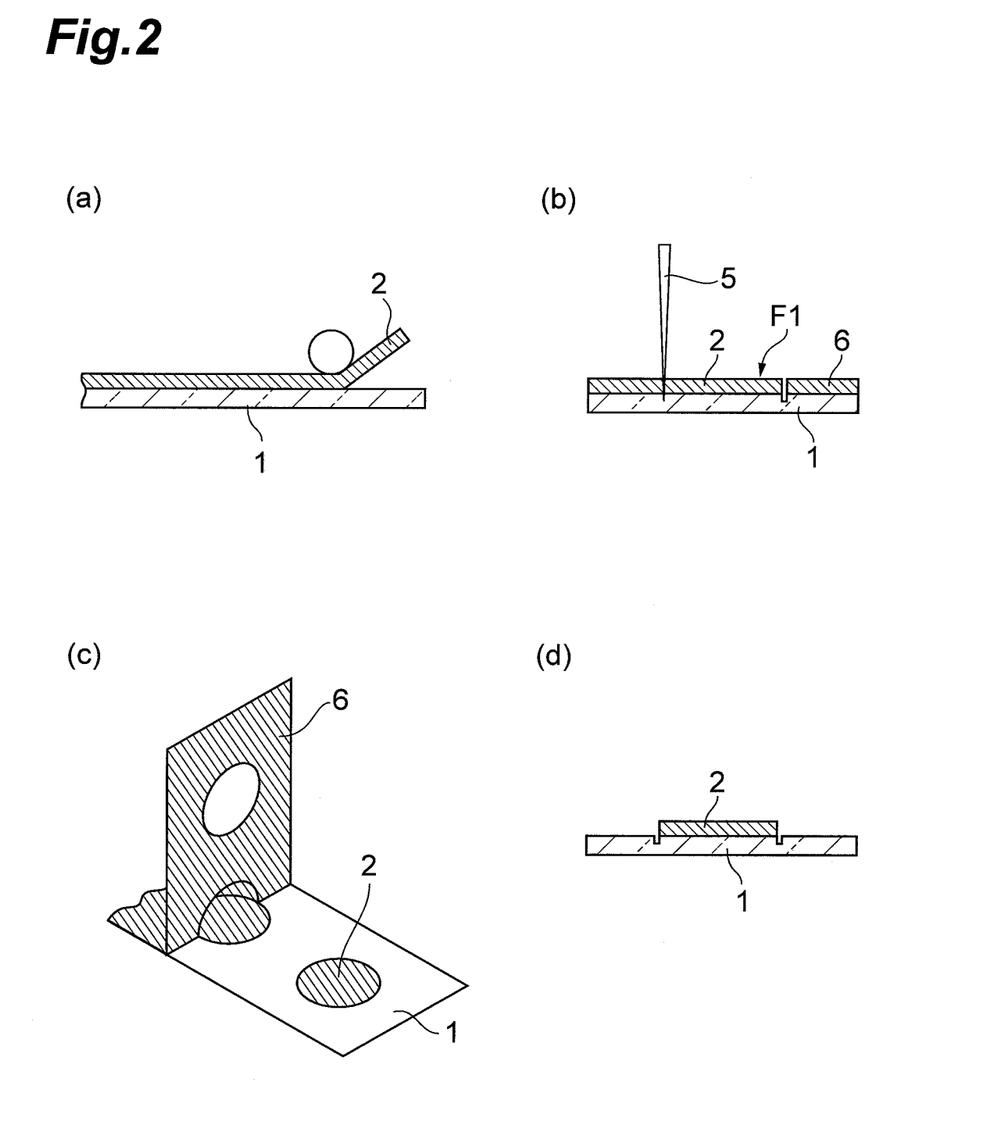
FIGS. 2(a) to 2(d) are a series of process drawings showing one preferred embodiment of a method for manufacturing an adhesive sheet according to the present invention.
Figure 4:
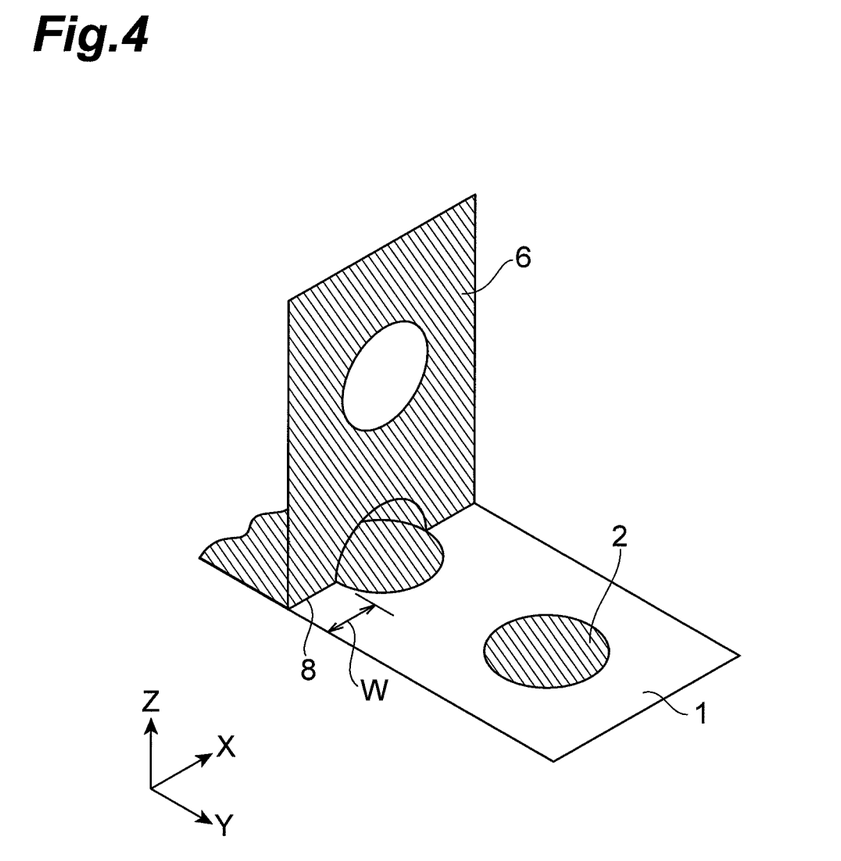
FIG. 4 is an explanatory view to describe a peeling step in a method for manufacturing an adhesive sheet according to the present invention.

FIG. 4 is an explanatory view to describe the peeling step shown in FIG. 2(*c*). In the peeling base material 1 and the adhesive layer 2 shown in FIG. 4, an X-axis direction in FIG. 4 is a short direction, a Y-axis direction is a long direction, and a Z-axis direction is a thickness direction. Further, W in FIG. 4 indicates a width of a narrow portion 8, which is the narrowest in width in the short direction of the unnecessary adhesive layer 6. In the method for manufacturing an adhesive sheet according to the present embodiment, the width W of the narrow portion 8 is adjusted so that the breaking strength in the narrow portion 8 of the unnecessary adhesive layer 6 is 200 g or more.

A method for adjusting the width W of the narrow portion 8 in the short direction of the unnecessary adhesive layer 6 is not limited in particular, and for example, the width W of the narrow portion 8 of the unnecessary adhesive layer 6 may be relatively broadened by reducing the size of a necessary adhesive layer 2 to be provided in the form of an island on the peeling base material 1. However, the size of a wafer has a limitation, and therefore it may be difficult to change the size of the wafer or the wafer may protrude from the adhesive layer 2. In view of this, a method is preferable in which the width of the narrow portion 8 of the unnecessary adhesive layer 6 is broadened by lengthening, in advance, the whole length of the adhesive layer 2 in the short direction without changing the size of the necessary adhesive layer 2.

In the method in which the whole length of the adhesive layer 2 in the short direction is lengthened in advance, the length in the short direction is not limited particularly, but it is better if the length is as long as possible, from the viewpoint of preventing the unnecessary adhesive layer 6 from being torn. However, there is a limitation on the maximum width of an apparatus for pre-cutting the adhesive layer 2, in a width direction (the short direction), and further, when the whole length in the short direction is lengthened, the amount of the unnecessary adhesive layer 6 increases, thereby decreasing production efficiency. In consideration of these, such a state is most preferable that the width in the short direction is narrow and the adhesive layer 6 is not tore in the step of peeling off the unnecessary adhesive layer 6.

In view of this, in the present invention, for the state in which the whole width of the adhesive layer 2 in the short direction is narrow and the adhesive layer 6 is not tore in the step of peeling off the unnecessary adhesive layer 6, the width W of the narrow portion 8 is broadened so that the breaking strength in the narrow portion 8 of the unnecessary adhesive layer 6 is 200 g or more. From the viewpoint of more sufficiently preventing the breakage of the unnecessary adhesive layer 6 in the peeling step, it is preferable for the breaking strength of the adhesive layer 6 in the narrow portion 8 to be 500 g or more, and it is further preferable for the break strength to be 1 kg or more. When this breaking strength is less than 200 g, the unnecessary adhesive layer 6 may be torn in the peeling step, thereby making it difficult to obtain an effect of the present invention. On the other hand, from the viewpoint of obtaining good production efficiency by reducing the amount of the unnecessary adhesive layer 6, it is preferable for the breaking strength of the adhesive layer 6 in the narrow portion 8 to be 1.5 kg or less. In a case where the breaking strength is more than 1.5 kg, it is possible to sufficiently obtain the effect of preventing the unnecessary adhesive layer 6 from being torn in the peeling step. In this case, it is preferable that the width W of the narrow portion 8 be narrowed more, so as to reduce the amount of the unnecessary adhesive layer 6.

The breaking strength in the present invention indicates strength when an adhesive layer breaks by pulling a measurement sample of the adhesive layer in an up-to-down direction at a rate of 50 mm/min. There is no limitation in particular on the length of the measurement sample at this time, but the length that allows the adhesive layer to be torn within a measuring range of a measuring apparatus is preferable. Further, it is necessary that the thickness of the measurement sample be the same as the thickness of the adhesive layer 2 to be pre-cut actually. Moreover, it is necessary that the width of the measurement sample be the same as the width W of the narrow portion 8 of the unnecessary adhesive layer 6 in the short direction. However, when some inconveniences occur in the measurement, such as the impossibility of measuring the breaking strength accurately because the adhesive layer 2 to be pre-cut actually is too thick or too thin in thickness or too wide or too narrow in width, one may measure the rupture strength of an adhesive layer having measurable thickness and width to calculate the breaking strength from the following formulae with the use of the rupture strength thus measured.

(Rupture Strength) [MPa]=(Breaking Strength) [kg]/ (Cross-sectional Area of Measurement Sample) [mm$^2$]

(Breaking Strength) [kg]=(Rupture Strength) [MPa]× (Width of Narrow Portion of Adhesive Layer in Actual Pre-cut) [mm]×(Thickness of Adhesive Layer to be Pre-cut Actually) [mm]

Further, from the viewpoint of sufficiently preventing the unnecessary adhesive layer 6 from being torn at the time of peeling, it is preferable that the ratio of the width W of the narrow portion 8 of the unnecessary adhesive layer 6 to the overall width of the adhesive sheet in the short direction be 12% or more.

The adhesive layer 2 in the present embodiment can be formed by use of well-known various types of thermosetting adhesives, photocurable adhesives, thermoplastic adhesives, oxygen-reactive adhesives or the like, which are used in adhesion (bonding) of a semiconductor chip. These adhesives may be used singly, or two or more types thereof may be used in combination.

The plane-view shape of the necessary adhesive layer 2 after peeling off the unnecessary adhesive layer 6 may be any shape which allows easy attachment of a semiconductor wafer thereto, and examples of the shape include a circle, a substantial circle, a quadrangle, a pentagon, a hexagon, an octagon, a wafer shape (a shape in which an outer periphery of a circle is partially linear), and the like. However, in order to reduce useless portions except for a semiconductor-wafer-mounting portion, the circle and the wafer shape are preferable.

The thickness of the adhesive layer 2 is not limited in particular, but the adhesive layer 2 with a larger thickness can prevent the breakage of the adhesive layer 6 in the step of peeling off the unnecessary adhesive layer 6. However, the thickness of the adhesive layer 2 has a limitation depending on a semiconductor device or the like, and it is usually 1 to 200 μm, preferably 3 to 150 μm, and further preferably, 10 to 100 μm. If the thickness is 1 μm or less, it tends to be difficult to secure sufficient die-bonding adhesive force, and if the thickness is 200 μm or more, the semiconductor device tends to be large and not to be fit to a design.

The peeling base material 1 is not limited in particular, but a die-bond dicing sheet is a sheet used for producing a semiconductor device, and in consideration of its production process, examples of the peeling base material 1 include polyester films such as a polyethylene terephthalate film, polyolefin films such as a polyvinyl acetate film, and plastic films such as a polyvinylchloride film and a polyimide film. Further, it is possible to use paper, nonwoven fabric, metallic foil, or the like, but it is preferable that the peeling base material 1 have releasability in view of the process of the production of a semiconductor device because one peels off the layered product 10 made up of the adhesive layer 2 and the self-adhesive film 3 from the peeling base material 1 to use thereof.

There is no limitation in particular on type and the like of the releasability of the peeling base material 1. One may perform a surface treatment to a surface of the peeling base material 1 which needs releasability, with a mold releasing agent such as a silicone-based release agent, a fluorine-based release agent, or a long-chain alkyl acrylate release agent.

The self-adhesive film 3 is not limited in particular, but a die-bond dicing sheet is a sheet used for producing a semiconductor device, and in consideration of its production process, the self-adhesive film 3 is preferably one which hardens by radiation or heat (that is, can control the adhesibility), more preferably one which hardens by radiation, and particularly preferably one which hardens by ultraviolet radiation.

It is preferable for the self-adhesive film 3 to be a film having a two-layer structure in which a self-adhesive layer is provided on a protective film. In this case, a layer in the self-adhesive film 3 on a side having contact with the adhesive layer 2 is the self-adhesive layer. Further, as mentioned earlier, the self-adhesive layer is preferably one which hardens by radiation or heat, more preferably one which hardens by radiation, and particularly preferably one which hardens by ultraviolet radiation.

The protective film is not limited in particular, but a die-bond dicing sheet is a sheet used for producing a semiconductor device, and in consideration of its production process, the protective film is preferably a film having a tensile elasticity of 1000 MPa or less at 25° C. from the viewpoint that the film is highly stretchable and has good working properties in an expanding step, and the protective film is more preferably a film having a tensile elasticity of 800 MPa or less, particularly preferably a film having a tensile elasticity of 600 MPa or less. This tensile elasticity is measured according to JIS K7113.

As for the shape of the protective film for protecting the self-adhesive layer, a die-bond dicing sheet is a sheet used for producing a semiconductor device, and in consideration of its production process, the plane-view shape of the protective film is preferably a circle, a substantial circle, or a dicing-ring shape.

In the method for manufacturing an adhesive sheet according to the present embodiment, the laminating of the adhesive layer 2 on the peeling base material 1 can be performed, for example, by: dissolving or dispersing a material for forming the adhesive layer 2 in a solvent so as to prepare a varnish for adhesive-layer formation; applying the varnish to the peeling base material 1; and removing the solvent by heating.

Further, the laminating of the self-adhesive film 3 on the adhesive layer 2 and the exposed peeling base material 1 can be performed by the following procedures, for example. Initially, one dissolves or disperses a material for forming a self-adhesive layer in a solvent so as to prepare a varnish for self-adhesive-layer formation, applies this varnish to a protective film, and subsequently, removes the solvent by heating, thereby forming a self-adhesive film 3 including the protective film and the self-adhesive layer. Then, one laminates the self-adhesive film 3 thus obtained so as to fully cover the adhesive layer 2 and the exposed peeling base material 1.

Here, as the application method of the varnish to the peeling base material 1 and the protective film, it is possible to use a well-known method, and it is possible to use, for example, a knife coating method, a roll coating method, a spray coating method, a gravure coating method, a bar coating method, a curtain coating method, and the like.

Further, the laminating of the self-adhesive film 3 can be performed by a conventionally known method, and it can be performed by use of a laminator, for example.

EXAMPLES

Hereinafter, the present invention will be described based on Examples and Comparative Examples more specifically, but the present invention is not limited to the following Examples.

Examples 1 to 12 and Comparative Examples 1 to 3

On long peeling base materials (PET films, made by Teijin DuPont Films Japan Limited, 500 mm×2000 mm), one formed the following 5 types of adhesive layers, thereby produced sheet examples 1 to 5.

Sheet Example 1

On a peeling base material, one formed an adhesive layer having a rupture strength of 18 MPa and a thickness of 5 μm, so as to produce sheet example 1.

Sheet Example 2

On a peeling base material, one formed an adhesive layer having a rupture strength of 18 MPa and a thickness of 10 μm, so as to produce sheet example 2.

Sheet Example 3

On a peeling base material, one formed an adhesive layer having a rupture strength of 18 MPa and a thickness of 25 μm, so as to produce sheet example 3.

Sheet Example 4

On a peeling base material, one formed an adhesive layer having a rupture strength of 4.5 MPa and a thickness of 10 μm, so as to produce sheet example 4.

Sheet Example 5

On a peeling base material, one formed an adhesive layer having a rupture strength of 4.5 MPa and a thickness of 25 μm, so as to produce sheet example 5.

(Production of Adhesive Sheets)

In each of Examples 1 to 12 and Comparative Examples 1 to 3, one performed pre-cutting of an adhesive layer on sheet examples 1 to 5, as shown in FIGS. 2(b) and 2(c), and adjusted the width of a narrow portion of an unnecessary portion of the adhesive layer as shown in Table 1. After that, one peeled off the unnecessary portion of the adhesive layer, and evaluated by visual observation whether the adhesive layer broke or not.

A case where the adhesive layer did not break was rated "A," and a case where the adhesive layer broke was rated "B." Further, one measured the breaking strength of the narrow portion of the adhesive layer in each of the Examples and Comparative Examples by the aforementioned measuring method of the breaking strength. Results thereof are shown in Table 1.

TABLE 1

| | Sheet example | Width of narrow portion (mm) | Breaking strength (g) | Breakage of adhesive layer |
| --- | --- | --- | --- | --- |
| Comparative Example 1 | Sheet example 1 | 20 | 185 | B |
| Example 1 | Sheet example 2 | | 350 | A |
| Example 2 | Sheet example 3 | | 900 | A |
| Comparative Example 2 | Sheet example 4 | | 90 | B |
| Example 3 | Sheet example 5 | | 230 | A |
| Example 4 | Sheet example 1 | 40 | 368 | A |
| Example 5 | Sheet example 2 | | 730 | A |
| Example 6 | Sheet example 3 | | 1840 | A |
| Comparative Example 3 | Sheet example 4 | | 187 | B |
| Example 7 | Sheet example 5 | | 450 | A |
| Example 8 | Sheet example 1 | 60 | 540 | A |
| Example 9 | Sheet example 2 | | 1100 | A |
| Example 10 | Sheet example 3 | | 2730 | A |
| Example 11 | Sheet example 4 | | 280 | A |
| Example 12 | Sheet example 5 | | 690 | A |

From those results, it was observed that when the breaking strength of the narrow portion in the unnecessary portion of the adhesive layer was 200 g or more, it was possible to sufficiently prevent the breakage of the adhesive layer at the time of peeling.

INDUSTRIAL APPLICABILITY

As described above, according to the present invention, it is possible to provide an adhesive sheet and a method for manufacturing the adhesive sheet, each of which can prevent an unnecessary adhesive layer from being torn in a step of peeling off the unnecessary adhesive layer from a peeling base material while leaving a necessary adhesive layer on the peeling base material in a method for producing an adhesive sheet in which an adhesive layer is provided on a long peeling base material in the form of an island.

REFERENCE SIGNS LIST

1 . . . peeling base material, 2 . . . adhesive layer, 3 . . . self-adhesive film, 6 . . . unnecessary portion of adhesive layer, 8 . . . narrow portion, 10 . . . layered product, 160, 200 . . . adhesive sheet.

The invention claimed is:

1. A method for manufacturing an adhesive sheet comprising a long peeling base material and an adhesive layer provided on the peeling base material in the form of an island, the method comprising:

laminating a long adhesive layer on a long peeling base material; and peeling off an unnecessary portion of the long adhesive layer so that a predetermined portion of the adhesive layer is left on the long peeling base material in the form of an island, wherein, in the peeling step, a ratio of the width of a narrow portion, which is the narrowest in width in a short direction of the unnecessary portion of the adhesive layer, to the overall width of the adhesive sheet in the short direction is 12% or more, and the breaking strength in the narrow portion is 200 g or more.

2. The method for manufacturing an adhesive sheet according to claim 1, wherein the thickness of the adhesive layer is 0.5 μm or more.

* * * * *